Nov. 10, 1959 W. L. HURFORD 2,912,580
PULSE AMPLIFYING AND LIMITING CIRCUIT ARRANGEMENTS
Filed April 30, 1956
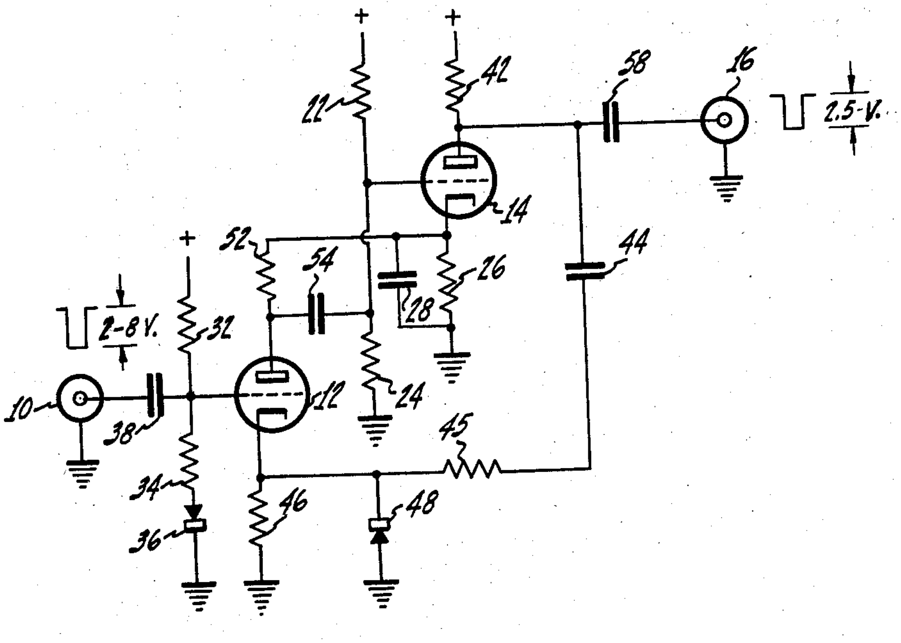
INVENTOR.
WINSLOW L. HURFORD
BY [signature]
ATTORNEY United States Patent Office 2,912,580

Patented Nov. 10, 1959

2,912,580

PULSE AMPLIFYING AND LIMITING CIRCUIT ARRANGEMENTS

Winslow Leroy Hurford, Collingswood, N.J., assignor to Radio Corporation of America, a corporation of Delaware Application April 30, 1956, Serial No. 581,489

7 Claims. (Cl. 250—27)

The invention relates to pulse handling circuitry, and it particularly pertains to circuit arrangements for presenting an output pulse signal of substantially constant amplitude in response to an input pulse signal of widely varying amplitude.

Pulse trains are frequently used to control the functioning of circuits for translating intelligence signals. Examples of such use are found in pulse multiplex telegraphy and telephony. Pulses recurring at regular intervals are also used in present day television broadcasting to synchronize the scanning of the electron beam reproducing the broadcast image with the scanning of the electron beam in the camera generating the image signal.

It is desirable, and sometimes necessary, that the amplitude of such pulse trains be relatively fixed so that amplitude variations do not have any effect on the intelligence signals. Frequently the conditions under which operation is desired are such that amplitude variations inadvertently enter into the pulse trains to degrade the intelligence signal. It has been suggested that a recipro-conductive circuit or multivibrator be used to regenerate the pulse train in order to produce a train of pulses of substantially constant amplitude regardless of the amplitude of the input triggering pulses. This arrangement is not always practical since the simpler recipro-conductive circuits are sensitive to variations in triggering pulse amplitude and usually require limiting circuit arrangements in order to avoid undesirable transients in the output signal. Furthermore, recipro-conductive circuits are usually less than satisfactory where the duty cycle or pulse rate must be varied, as in the case of television synchronizing and blanking signals. Straight forward amplifying circuits followed by positive and negative limiting circuits have been used in the past but, like the recipro-conductive circuit arrangements are limited in range and consume a relatively large amount of power.

An object of the invention is to simplify circuitry for producing a pulse train of substantially constant amplitude in response to input pulses of amplitude which may vary over a relatively large range.

Another object of the invention is to provide a simplified circuit arrangement for producing substantially constant output pulses in response to triggering pulses of varying amplitudes at a reduced expenditure of power.

According to the invention a pair of controlled electron flow path devices are switched to produce an output pulse train of substantially constant amplitude in response to input pulses of amplitude varying as much as three-to-one or more. The two devices are connected in series with respect to the direct energizing potential connections with one of the devices biased conducting to relatively small degree and the other device biased normally to cut-off. A charge storing device is interposed in the circuit to store a charge proportional to the current flowing through the other device, which current flows for the duration of the signal pulses only. The potential across the charge storing device is the sole source of energizing potential for the one device between the recurring pulses of the signal. The low value of energizing potential thus effects a short range of control voltage change for the one device. Negative going input pulses are applied to the one device to block the same and the resulting increased potential at the output of the one device is applied to the input circuit of the other device to effect conduction thereof. Thus the circuit according to the invention functions as a switching device with a very low expenditure of energizing power. In order to insure limited output pulse amplitude for low input pulse amplitude, a feedback circuit is connected between the two devices to effect more constant output from the first device and means, preferably in the form of a diode element connected in common to the feedback and input circuits of the one device to conduct on peak voltages, are provided for disabling the feedback circuit for very strong signals.

For large input signals, the one device is blocked and the resulting increased potential at the output is applied to the input of the other device, producing conduction therein. The subsequent decrease of potential at the output electrode of the other device, effectively repeats the input signal with such amplification as is desired. For input signals below a predetermined minimum amplitude, the one device is not blocked but is rendered less conductive, whereby a somewhat smaller output pulse is developed. The variation in output with input variations are reduced by the feedback circuit which effectively changes the input characteristics of the input device. For input signals of more than the predetermined minimum amplitude, the one device produces a constant amplitude positive going output signal which in turn produces conduction in the other device and thus a higher amplitude pulse at the output of the other device. In this case, the feedback disabling means operates to clamp common circuit electrode of the one device at the reference level, shown as ground. The input signal is then effective to block the input device tending to level off the output signal at the desired value.

In order that the advantages of the invention may be readily obtained in practice, an embodiment of the invention, given by way of example only, will be described with reference to the accompanying drawing in which the sole figure is a schematic diagram of a synchronizing pulse handling circuit for television applications.

A negative going input pulse train is applied at input terminals 10 and translated by means of a pair of controlled electron flow path devices, shown as triode vacuum tubes 12 and 14, to output terminals 16 at which a pulse signal of substantially constant amplitude is desired. While vacuum tubes are given as examples, the controlled electron flow path device may be of any other type of controlled electron flow path devices such as transistors and the like. A potentiometer comprising a pair of resistors 22, 24 connected across the source of energizing potential is connected to the input circuit or control electrode of the triode 14 to bias the same positive so that the triode 14 will conduct initially. The term energizing potential as employed hereinafter should be construed as including both the application of positive and negative potential to the grid electrode of a vacuum tube and negative and positive potential to the collector electrode of a transistor or similar controlled electron flow path device for controlling the mean value of electron flow as desired. A cathode resistor 26 is connected between the cathode of the output triode 14 and the negative pole of the potential source, shown as connected at ground reference potential. Current flow through the cathode resistor 26 during the initial conduction and other periods in which the output triode 14 conducts places a charge across the capacitor 28 sufficient to iniate operation and which constitutes the energizing potential supply for the input triode 12. The voltage level set by the potentiometer resistors 22 and 24 is sufficiently negative with respect to the potential stored in the storage capacitor 28 during normal operation with an input signal so that the output triode 14 is normally blocked, or cut-off, and conducts only during the pulse interval. The low value of energizing potential thus provided for the input triode 12 results in a short range of grid or control voltage change between zero bias and cut-off for the input triode 12. The input triode 12 is biased so that a small postive voltage appears at the cathode of the input triode 12. The bias is obtained by a pair of resistors 32, 34 connected by means of a unilateral impedance device shown as a semi-conductor diode element 36 across the direct energizing potential supply. The diode 36 is arranged to restore the direct component of the input signal which is lost in translation by the coupling capacitor 38. The negative going input signal impressed on the input circuit of the input triode 12 drives the control electrode negative thereby increasing the potential at the anode electrode to a value at which the output triode 14 is driven into conduction. Conduction of the output triode 14 causes current flow through the cathode resistor 26 and recharge of the potential supplying capacitor 28 as well as lowering of the potential at the output circuit or anode electrode of the output tube 14 to develop a negative going pulse across an output load resistor 42. The negative output pulse is applied by means of a series capacitor 44 and a feedback resistor 45 to the common circuit or cathode electrode of the input triode 12. The feedback voltage is developed across a cathode resistor 46 in the input circuit of the input triode 12. A unilateral impedance device shown as a semi-conductor diode element 48 is shunted across the cathode resistor 46 to disable feedback circuit at the point where the negative voltage fed back to the cathode electrode is equal to the direct potential established across the cathode resistor 46 by current flow through the input triode 12. At this point the disabling diode 48 conducts, effectively halting the feedback operation. Under such conduction the input circuit or control electrode of the input triode 12 may be driven below cut-off and the drive voltage from the input triode 12, applied by means of a coupling capacior 54 to the control electrode of the output triode 14, is stabilized rendering the output signal level independent of fairly wide variations in input signal level.

An output coupling capacitor 58 is interposed between the load resistor 42 and the output terminals 16 for blocking the flow of direct current. This capacitor may be eliminated if the utilization circuit will tolerate the direct current flow. Also the blocking capacitor 58 may be used to couple the feedback resistor 45 to the load 42 in some situations so that the capacitor 44 may be eliminated.

Since the power for the input triode 12 is obtained by accumulation of the average pulse current of the output triode 14, the total power required from the power supply for average anode current is very little more than the product of the duty cycle and the ratio of the peak-to-peak output voltage to the load impedance.

The circuit shown in the drawing was intended for limiting the amplitude of synchronizing pulses obtained from a studio synchronizing pulse generator for application to a camera through a low impedance line. Normally the input pulse amplitude is about 4 volts. If the input line were to be double terminated, as sometimes is the case, the resultant input pulse amplitude would be only 2 volts, but if the input line were unterminated, the pulse input would be about 8 volts. With the circuit according to the invention, a standard output would be available for the camera under all conditions. If desired the signal may be amplified as well as limited by altering the circuit values in known manner.

Those skilled in the art will readily determine the values of the pertinent components in applying the invention to their needs, however, the values listed below are suggested as a guide to the practice of the invention.

| Ref. No. | Component | Type or Value |
|---|---|---|
| 12, 14 | Voltage amplifier tubes | 6BQ7A. |
| 22 | Grid biasing resistor | 3.3M. |
| 24 | do | 510K. |
| 26 | Cathode resistor | 10K. |
| 28 | Bypass capacitor | 1,500 mf. |
| 32 | Grid biasing resistor | 2.7M. |
| 34 | Grid leak resistor | 10K. |
| 36 | D.-C. restoring diode | 1N34A. |
| 38 | Input coupling capacitor | 0.47 mf. |
| 42 | Output load resistor | 5.1K. |
| 44 | Feedback coupling capacitor | 50 mf. |
| 45 | Feedback coupling resistor | 750 O. |
| 46 | Cathode resistor | 360 O. |
| 48 | Feedback blocking diode | 1N34A. |
| 52 | Interstage load resistor | 6.8K. |
| 54 | Interstage coupling capacitor | 0.1 mf. |
| 58 | Output coupling capacitor | 50 mf. |

The invention claimed is:

1. A pulse amplifying and limiting circuit arrangement including, a pair of controlled electron flow path devices each having input, output and common circuit electrodes, means to apply direct energizing potential to one of said devices including means coupled to the output circuit electrode of said one device and to the common circuit electrode of the other of said devices for storing a potential proportional to current flow in said other device, means biasing said other device normally to cut-off, means biasing said one device normally to cause electron flow in said one device, means for applying a pulse signal between the input and common circuit electrodes of said one device, means coupling the output electrode of said one device to the input electrode of said other device, and means for deriving an output signal from said other device.

2. A pulse amplifying and limiting circuit arrangement including, a pair of controlled electron flow path devices each having input, output and common circuit electrodes, means to apply direct energizing potential to one of said devices including means coupled to the output circuit electrode of said one device and to the common circuit electrode of the other of said devices for storing a potential proportional to current flow in said other device, means biasing said other device normally to cut-off, means biasing said one device normally to cause electron flow to a small degree in said one device, means including a capacitor for applying a negative going pulse signal between the input and common circuit electrode of said one device, means coupling the output electrode of said one device to the input electrode of said other device, means for deriving an output signal from said other device, feedback means including a resistive element coupled between the output electrode of said other device and the input circuit of said one device tending to oppose any change in voltage gain of the circuit arrangement, and means including a unilateral conductor coupled to the input circuit of said one device responsive to the signal appearing at the output circuit electrode for disabling said feedback means.

3. A pulse amplifying and limiting circuit arrangement including, a pair of electron discharge devices, each having control, anode and cathode electrodes, means to apply direct energizing potential to said devices including means connecting the anode electrode of one of said devices to the cathode electrode of the other of said devices and a potential storage means coupled to the cathode electrode of said other device for providing a stored potential and applying said stored potential to the anode electrode of said one device, means biasing said one device normally to cause current flow in said one device, means biasing said other device normally to cut-off, means for applying a negative going pulse signal between the control and cathode electrodes of said one device, means including a capacitor coupling the anode electrode of said one device to the control electrode of said other device, means coupled to the anode electrode of said other device for deriving an output signal, and feedback means coupled between the anode electrode of said other device and the cathode of said one device tending to oppose any change in voltage gain of the circuit arrangement.

4. A pulse amplifying and limiting circuit arrangement including, a pair of electron discharge devices, each having control, anode and cathode electrodes, means to apply direct energizing potential to said devices including means connecting the anode electrode of one of said devices to the cathode electrode of the other of said devices and a potential storage means coupled to the cathode electrode of said other device for providing a stored potential and applying said stored potential to the anode electrode of said one device, means biasing said one device normally to cause current flow in said one device, means biasing said other device normally to cut-off, means for applying a negative going pulse signal between the control and cathode electrodes of said one device, means including a capacitor coupling the anode electrode of said one device to the control electrode of said other device, means coupled to the anode electrode of said other device for deriving an output signal, and feedback means including a resistive element coupled between the anode electrode of said other device and the cathode of said one device tending to oppose any change in voltage gain of the circuit arrangement, and means including a unilateral conductor coupled to the cathode electrode of said one device for disabling said feedback means.

5. A pulse amplifying and limiting circuit arrangement including, a pair of electron discharge devices each having control, anode and output electrodes, means to apply direct energizing potential to said devices including means connecting the anode electrode of one of said devices to the cathode electrode of the other of said devices, a cathode resistor connected between the cathode electrode of said one device and a point of fixed reference potential, means biasing said one device normally to cause current flow to a small degree in said one device, means biasing said other device normally to cutoff, a capacitor and a resistor connected in parallel between the cathode electrode of said other device and said point of reference potential, means including a capacitor for applying a negative going pulse signal between the control and cathode electrodes of said one device, means including a diode element coupled between said control electrode and said point of reference potential for restoring the direct component of said signal, a capacitor connected between the anode electrode of said one device and the control electrode of said other device, feedback means including resistive and capacitive elements coupled between the anode electrode of said other device and the cathode electrode of said one device tending to oppose any change in voltage gain of the circuit arrangement, means including a diode element connected across the cathode resistor of said one device for disabling said feedback means, and means for deriving an output signal between the anode electrode of said other device and said point of reference potential.

6. In an electrical signal limiting circuit suitable for limiting the amplitude of pulse waveforms applied thereto, said pulse waveforms being defined by signal amplitude changes having substantially sharp transitions and representing a substantial bandwidth of signal intelligence, the combination of: input terminal means for accepting a pulse waveform of the type described, the amplitude of said pulse component being undesirably variable but in excess of a predetermined minimum amplitude; signal limiting means comprising a signal transducing means having input terminals for accepting an input signal and output terminals for delivering an output signal, the signal transfer characteristic between said input terminals and output terminals being discontinuous during operation of said transducing means so as to provide a clipping action upon input signals having an amplitude exceeding said predetermined minimum amplitude; means coupling said input terminal means to the input terminals of said transducing means so that said output signal represents a limited version of said input signal; negative feedback means operatively coupled between said output terminals and said input terminals for imposing negative feedback around said transducing means; and signal amplitude responsive means included in said feedback means for disabling said feedback means in response to signals applied to said input terminals, the amplitude of which exceed said predetermined minimum amplitude to effectuate negative feedback around said amplifier only during sharp transition periods defining said pulse waveform.

7. In a pulse limiting circuit, the combination of: input terminal means for accepting a train of pulses, the peak amplitude of which is subject to undesirable variation but exceeds a predetermined amplitude level; means operatively coupled with said input terminal means for transducing said train of pulses only for excursions thereof of up to but not exceeding amplitudes in excess of said predetermined amplitude level; negative feedback means connected around said transducing means to lower the output impedance thereof; and signal amplitude responsive means connected with said negative feedback means and responsive to the amplitude of the signals fed back by said feedback means to disable said feedback means in response to signal amplitudes exceeding said predetermined amplitude level, so that said negative feedback means is effective only during sharp transitions in said pulse waveform which occur at amplitude levels not in excess of said predetermined amplitude level.

References Cited in the file of this patent

UNITED STATES PATENTS

| | | |
|---|---|---|
| 2,398,596 | Price | Apr. 16, 1946 |
| 2,442,286 | Dodds et al. | May 25, 1948 |
| 2,509,742 | Mynall | May 30, 1950 |
| 2,529,666 | Sands | Nov. 14, 1950 |
| 2,627,576 | Howarth | Feb. 3, 1953 |
| 2,683,806 | Moody | July 13, 1954 |
| 2,691,101 | Casey | Oct. 5, 1954 |
| 2,752,487 | DeVore | June 26, 1956 |
| 2,762,010 | Rose et al. | Sept. 4, 1956 |